July 8, 1924.

W. BILODEAU

CHEESE CUTTER

Filed Feb. 17, 1923  3 Sheets-Sheet 1

Inventor
William Bilodeau
By
Attorney

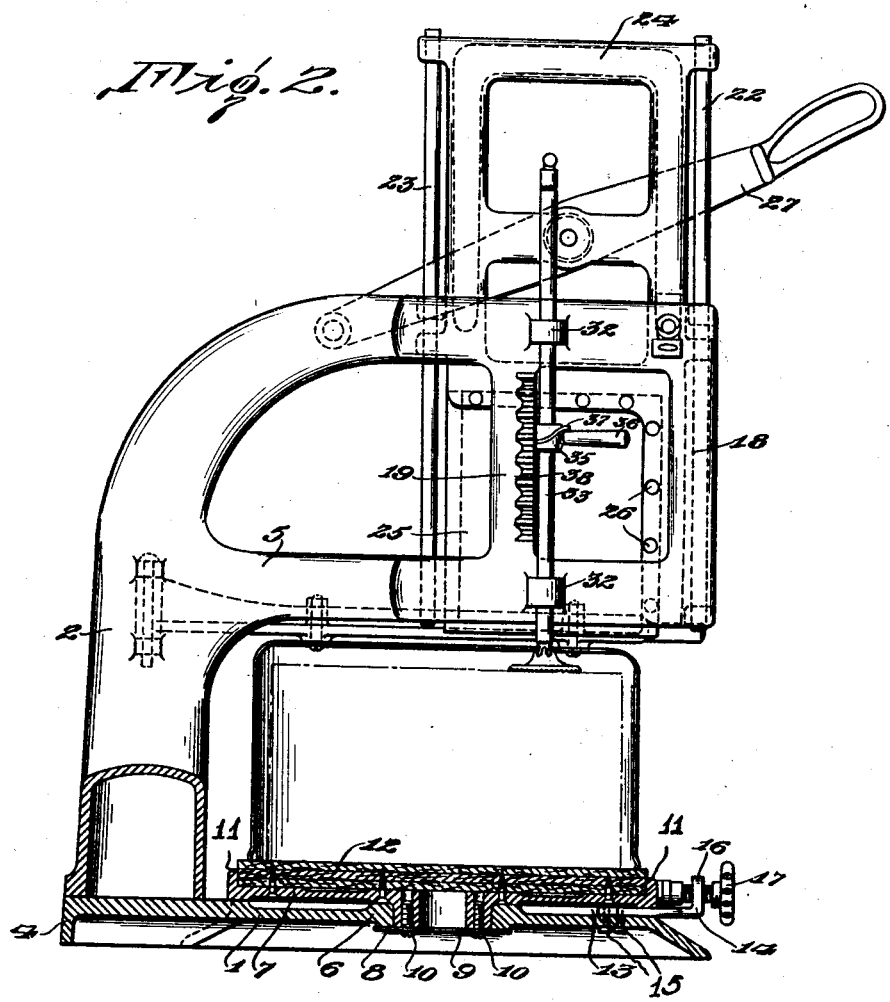

July 8, 1924.
W. BILODEAU
CHEESE CUTTER
Filed Feb. 17, 1923
1,500,179
3 Sheets-Sheet 3
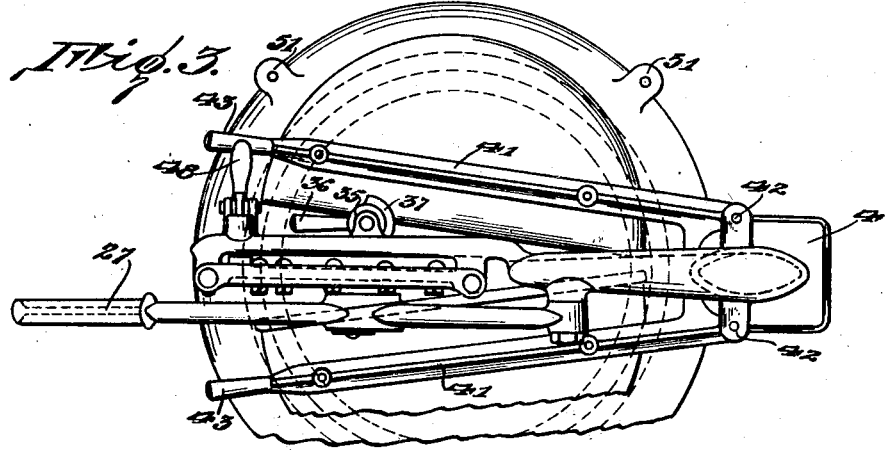
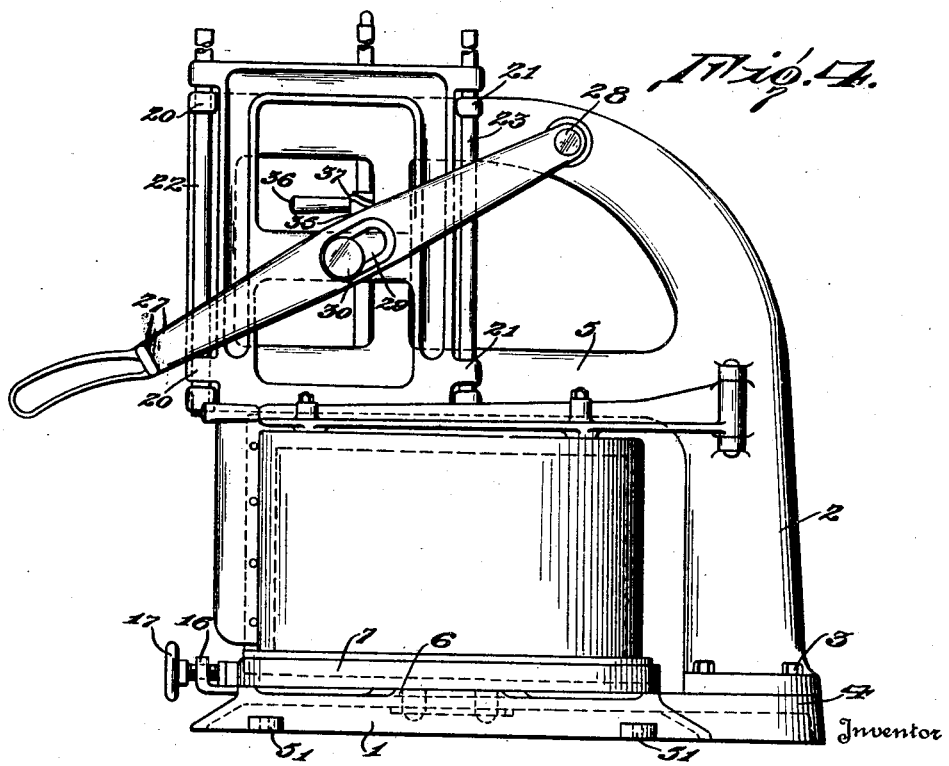
Inventor
William Bilodeau
By
Attorney Patented July 8, 1924.

1,500,179

UNITED STATES PATENT OFFICE.

WILLIAM BILODEAU, OF MONTREAL, QUEBEC, CANADA.

CHEESE CUTTER.

Application filed February 17, 1923. Serial No. 619,617.

*To all whom it may concern:*

Be it known that I, WILLIAM BILODEAU, a subject of the King of England, residing at Montreal, in the Province of Quebec and Dominion of Canada, have invented certain new and useful Improvements in a Cheese Cutter, of which the following is a specification.

This invention relates to improvements in cheese cutters, but is also capable of being used for other purposes, such as the cutting of butter, lard, etc.

The invention has for its prime object to provide a combination cheese stand, cover, and cutter.

A further object of the invention is to provide a machine for holding a circular cake of cheese so that slices of any desired size may be cut therefrom.

A still further object of the invention is to provide a cutter in combination with a cover, whereby when not actually cutting the cheese, the knife is suspended above the cake of cheese and the cheese itself is entirely encased in an airtight cover, thus keeping same fresh and moist at all times.

And a still further object of my invention is to provide a cheese cutter in combination with a supporting platform, whereby the platform may be revolved for bringing any portion of the cheese directly under the knife, and whereby the revolving table is locked in a fixed position prior to cutting the cheese.

Another object of the invention is to provide a cheese cutter of the above indicated character, which is simple in construction, durable, efficient for the purpose intended, and one that can be manufactured and placed on sale at a relatively low cost.

These and like objects of the invention will be better understood as the description follows and as is specifically pointed out in the appended claims.

Referring to the accompanying drawings which form a part of this specification and which clearly illustrate the construction and operation of my improved cheese cutter, Figure 1 is a front elevation of a cheese cutter constructed in accordance with my invention.

Figure 2 is a side elevation of same, showing the cutter blade elevated to its upmost limit.

Figure 3 is a top plan view of my improved cutter.

Figure 4 is a side elevation showing the cutting blade lowered or in a cutting position.

Figure 6 is a detail plan view of the revolving table support.

Referring to the accompanying drawings in detail, like characters will be used to designate like parts in the different views.

Figure 1:
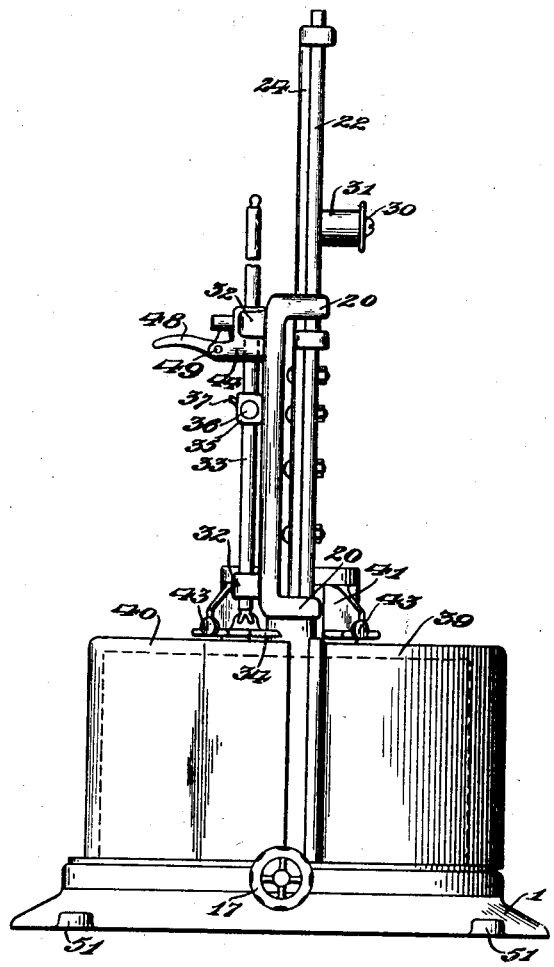
Figure 5:
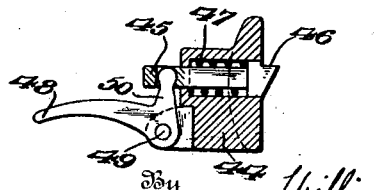
Figure 5 is a sectional detail view of the knife holding and locking mechasism.

In the drawings, the numeral 1 indicates the base of my improved cheese cutter and holder. A bracket arm 2 is secured to an extension at the rear of the circular base 1 by means of bolts 3, the extension of the circular base being indicated by the numeral 4. The bracket 2 extends upwardly and is so bent as to have the end of same positioned in approximately the center of the base 1. An arm 5 is formed integral with the bracket 2 intermediate the ends of same and extends outwardly at right angles to the lower half of the bracket so that the same is in a parallel line with the supporting base 1. The base 1, extension 4, bracket 2, and arm 5 are all constructed of cast iron.

The center of the base 1 on its upper side is provided with a circular flange 6, which acts as a bearing or support for a revolving table 7. The revolving table 7 is provided with a hub 8 centrally of same and the hub 8 extends downwardly through an aperture formed within the flange and circular base 1. The table 7 while permitted to have free rotation, is held against dislodgment from the base 1 by means of a plate 9 that extends across the bottom of the aperture within the base and is secured to the hub 8 by fastening screws 10. The periphery of the revolving table 7 is provided with an upstanding flange 11, so that a hard wood base 12 may be supported within the revolving table or on the revolving table. A space 13 is provided between the base 1 and the revolving table 7 by the flange 6, so that a plate 14 may be inserted from the front of the machine between said base and table and secured in a rigid position by means of fastening bolts 15. The outer end of the plate 14 is provided with an upwardly bent portion 16 to provide a bearing for a lock screw 17 that engages the flange 11 of the revolving table and holds the revolving table and wooden base in a fixed position. It is to be understood that cheese which is usually sold in circular cakes is adapted to be supported on the wooden base and that by loosening the lock screw 17, the revolving table and wooden base can be revolved to move any part of the cheese under the cutting knife, which will be hereinafter explained.

The ends of the bracket 2 and the arm 5 are connected by a vertical arm 18 and are also spaced apart by means of the arm 19. The extreme ends of the bracket 2 and the arm 5 have loops or eyes 20 formed integral thereon and loops or rings 21 are also formed on the bracket 2 and arm 5 at a point in the rear of the supporting arm 19. A guide post 22 and 23 are supported in their respective rings or loops 20 and 21.

A cutter blade frame 24 is slidably mounted on the guide posts 22 and 23, and a cutting blade 25 is secured to the blade holder by means of fastening bolts 26. A handle is pivotally connected as at 28 to the bracket 2 and intermediate the ends of the handle the same is provided with a slot 29 for receiving therein a shaft 30 carried by the cutter blade frame. The shaft 30 is provided with a collar 31.

In order to hold the cheese from turning while being cut with the blade 25, the bracket 2 and arm 5 are provided with loops 32 in which is positioned for vertical movement a rod 33 on the lower end of which is positioned a clamp 34 having a serrated face for engagement with the cheese. A sleeve 35 having a handle 36 is loosely mounted on the rod 33 and the sleeve 35 is provided with a cam 37 which is adapted to engage teeth 38 formed in the supporting arm 19.

A cover for the cheese is provided which consists of a pair of sections 39 and 40. The sections are supported by arms 41 which are pivotally connected as at 42 to the bracket 2. Each of the arms is provided with a handle 43, so that by moving the handles inwardly or outwardly from the center of the base 1, the circular cake of cheese is either covered or uncovered.

In order to hold the cutting blade 25 in a suspended position when the cover sections are closed over the cheese, a latch is provided which comprises a bracket 44 having a bolt 45 with a clutch 46 on one end slidable therein and adapted to be held outwardly for engagement with the knife handle by a coil spring 47. A handle 48 is pivotally connected as at 49 to the bracket and a knob 50 of the handle engages a recess formed in the sliding bolt so that upon downward pressure on the handle 48, the bolt 45 is withdrawn against the tension of the spring 47, which permits the knife 25 to be moved downwardly into engagement with the cheese.

The supporting base is provided with a lug 51 so that the same may be securely fastened in place on a counter, or any other support convenient for the cutting of the cheese.

In the operation of my cheese cutter, we will assume that a circular cake of cheese is supported on the wooden platform and that the knife is in the position indicated in Figure 4. The cover sections are moved outwardly until the cheese is exposed, after which the clamp 34 is brought into engagement with the cake of cheese by operating the handle 36, which forces the cam 37 into engagement with the teeth 38, after which the sliding bolt 45 is withdrawn by means of the handle 48 which permits the operator to move the knife downwardly into engagement with the cheese by exerting pressure on the handle 27. In case the operator desires to cut the cheese in a different place from where the first cut has been made, the lock screw 17 is loosened, which permits the table 7 to revolve to bring a different portion of the cheese directly under the cutting blade.

While I have shown and described the preferred form of my combination cheese cutter, cover, and support, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

1. In a cheese cutter, comprising a supporting base, a supporting bracket, a vertically moving knife carried by said supporting bracket, means for moving said knife into engagement with a cake of cheese on said supporting base, a sectional cover over the cheese cake provided with arms pivotally connected to the said supporting bracket, a rod slidably supported by said bracket and arm, a clamp carried by one end of said rod, and means loosely mounted on said rod for engagement with rack teeth carried by said bracket and supporting arm for holding a cake of cheese.

2. In a cheese cutter, comprising a supporting base, a rotary table pivoted on said base, means for locking the rotary table stationarily to the said base, a supporting bracket, a vertically moving knife carried by said bracket, means for moving the said knife into engagement with a cake of cheese on said rotary table, a rod slidably supported by said bracket and arm, a clamp carried by one end of said rod, and means for locking said arm and clamp in position for holding a cake of cheese while being cut.

3. In a cheese cutter, comprising a supporting base, a supporting bracket, a vertically moving knife carried by said supporting bracket, means for moving said knife into engagement with a cake of cheese on said supporting base, a rod slidably supported by said bracket and arm, a clamp carried by one end of said rod, and means loosely mounted on said rod for engagement with rack teeth carried by said bracket and supporting arm for holding the cake of cheese in position while being cut.

In testimony whereof, I have affixed my signature in the presence of two witnesses.

WILLIAM BILODEAU.

Witnesses:
P. McNichol,
J. Paucher.